United States Patent [19]
Edgeller

[11] Patent Number: 6,017,083
[45] Date of Patent: Jan. 25, 2000

[54] ENCLOSURE HAVING A RESILIENT COVER

[75] Inventor: Peter Edgeller, Southport, United Kingdom

[73] Assignee: Ingersoll-Rand Company, Woodcliff, N.J.

[21] Appl. No.: 09/212,300

[22] Filed: Dec. 16, 1998

[51] Int. Cl.$^7$ ....................................................... B60P 7/02
[52] U.S. Cl. ..................... 296/181; 296/901; 296/100.07; 49/379; 180/69.24; 220/213; 220/305
[58] Field of Search .................................... 296/168, 181, 296/173, 24.1, 39.3, 901, 37.14, 37.1; 180/69.24, 69.22, 69.23; 280/204, 153.5, 154, 848; 220/213, 305, 845, 848; 49/379, 364, 386

[56] References Cited

U.S. PATENT DOCUMENTS

| | | | |
|---|---|---|---|
| 3,583,513 | 6/1971 | Macadam et al. | 180/69.24 |
| 3,622,028 | 11/1971 | Lohrer | 215/253 |
| 3,853,250 | 12/1974 | Alpern | 222/517 |
| 4,413,748 | 11/1983 | Kessler et al. | 220/212.5 |
| 4,558,806 | 12/1985 | Shabram, Sr. et al. | 222/556 |
| 4,739,900 | 4/1988 | Borst | 220/835 |
| 4,969,574 | 11/1990 | Shastal | 220/269 |
| 5,022,566 | 6/1991 | Song et al. | 222/480 |
| 5,105,965 | 4/1992 | Ullman | 220/281 |
| 5,273,117 | 12/1993 | Reimert | 166/348 |
| 5,518,262 | 5/1996 | Hutchinson et al. | 280/475 |
| 5,573,132 | 11/1996 | Kanfer et al. | 220/4.23 |
| 5,797,523 | 8/1998 | Gross | 222/498 |

*Primary Examiner*—D. Glenn Dayoan
*Assistant Examiner*—Patricia Engle
*Attorney, Agent, or Firm*—Michael M. Gnibus

[57] ABSTRACT

An enclosure has an outer surface and an inner surface and an opening extending between the outer and inner surfaces. The outer surface of the enclosure includes a curved region surrounding the opening; the curved region having a radius. The enclosure includes a resilient cover which is hingedly secured to the enclosure for selectively covering the opening. The resilient cover moves between a first open position and a second closed position. The resilient cover is molded to normally have a first radius which is greater than the radius of the curved region of the enclosure. When in the first open position, the resilient cover defines an arch having the first radius. When in the second closed position, the resilient cover is compressed and flexes so as to conform to the shape of the curved region of the enclosure. Thus, in the second closed position, the resilient cover defines an arch having a second radius which is smaller than the first radius. The resilient cover may be held in place using a securing element. When the securing element is placed in an unlocked position, the resilient cover is capable of springing open and transforming back to its natural shape.

20 Claims, 6 Drawing Sheets ic shape selected from the group consisting of polygons, parallelograms and circles. The resilient cover generally has an outer periphery which substantially conforms to the shape of the opening. When viewed from the side, the resilient cover is shaped or molded to normally have a first radius which is greater than the radius of the curved region of the enclosure. However, the cover may be flexed and bent so that when the resilient cover is in the first open position the resilient cover defines an arch having a first radius greater than the radius of the curved region of the enclosure, and when the resilient cover is in the second closed position the resilient cover defines an arch having a second radius which is smaller than the first radius. In other words, when the resilient cover is in the second closed position, the shape of the resilient cover substantially conforms to (i.e., substan-

ENCLOSURE HAVING A RESILIENT COVER

BACKGROUND OF THE INVENTION

1. Field of the Invention

The present invention generally relates to an enclosure having an access cover and more specifically relates to an enclosure for a portable machine, the enclosure including a resilient cover which provides access to a portion of the portable machine.

2. Description of the Prior Art

Portable machines, such as portable air compressors, are typically mounted upon a trailer and include a protective enclosure or cover secured over the top of the air compressor. The trailer may include wheels and a tow bar so that the trailer may be easily moved between job sites. Upon arriving at a job site, the air compressor may be operated to provide compressed air for pneumatic tools and other devices.

U.S. Pat. No. 5,518,262 discloses a trailer for a portable air compressor including a lower frame having two wheels rotatably mounted thereto and a towing assembly mounted to a front end of the lower frame for towing the trailer between job sites. The air compressor is mounted to the lower portion of the trailer. The trailer typically includes a cover secured atop the lower frame, the cover having one or move hatches which may be selectively opened for gaining access to the air compressor. The cover generally protects the air compressor and other internal components, such as the engine, control panel and gauges, etc. . . . , necessary for operating the compressor. The cover also attenuates and/or muffles noises produced during operation of the compressor. The trailer disclosed in the '262 patent has proven to be extremely reliable and serviceable due, in part, to the heavy-duty steel used to construct the trailer.

An operator of a portable air compressor must frequently interface with one or more control panels. The control panels may contain switches for starting the air compressor and regulating the flow of compressed air. The control panels may also include gauges for monitoring the performance of the air compressor. The control panels are usually protected by covers which shield the relatively delicate switches and instruments provided on the control panels. Operators frequently have difficulty opening the control panel access covers because the covers are generally designed to fit flush with the outside surfaces of the trailer enclosure and an operator wearing heavy gloves cannot easily grasp an edge of the cover. This is particularly true if the enclosure for the air compressor is made of polymer materials, such as the enclosure disclosed in commonly assigned, co-pending U.S. patent application Ser. No. 09/175,268, the disclosure of which is hereby incorporated by reference herein. In response, attempts have been made to provide such polymer covers with apertures or handles for lifting the cover. One design was directed to cutting or molding an aperture either in the cover itself or in an area of the enclosure adjacent the cover. This design has proven effective for enabling operators to open the cover, however, the aperture provides a weak point at which an intruder may breach the integrity of the enclosure and gain unauthorized access to the interior region thereof. Other designs are directed to molding protrusions, such as handles, on the outer surface of the cover. Such designs are generally ineffective because the shape of the cover and the limitations inherent in molding processes limit the size of the protrusion. In addition, molded handles protrude from the cover and are likely to break off from the cover during extended use or a high-impact collision.

Thus, there is a need for an improved enclosure having an access cover which is durable, secure and capable of being readily opened. In particular there is a need for a polymer cover for an enclosure which automatically springs to the open position when an operator desires to gain access to the interior region of the enclosure. The cover should be resilient and durable so that the cover does not fatigue and so that the cover may be repeatedly opened and closed during long-term use of the enclosure.

SUMMARY OF THE INVENTION

In accordance with one preferred embodiment of the present invention, an enclosure for a portable machine has an outer surface and an inner surface and an opening extending between the outer and inner surfaces for accessing an interior region of the enclosure. One preferred enclosure is disclosed in commonly assigned U.S. patent application Ser. No. 09/175,268 filed Oct. 20, 1998, the disclosure of which is hereby incorporated by reference herein. The outer surface of the enclosure may include a curved region having a radius, the curved region preferably surrounding the opening of the enclosure. The enclosure may include a lower body including a trailer having wheels rotatably mounted thereto. The lower body preferably includes a polymer, such as a high density polyethylene. In other preferred embodiments, the lower body may include other moldable materials, such as a medium density polyethylene or nylon. The enclosure also preferably includes an upper body which also preferably comprises a polymer material. The upper body may include acrylonitrile butadiene styrene (ABS), a polymer material having a different coefficient of thermal expansion than the lower body. The upper body may be molded using a vacuum molding process. As described in the '268 application, the use of polymer materials for the enclosure enhances sound attenuation due to the natural ability of polymers to muffle sound. As is known to those skilled in the art, polymers muffle sound more efficiently than metals because the molecular structure of a polymer is less dense than that of metal.

The enclosure includes a resilient cover which is preferably hingedly secured to the enclosure for selectively covering the opening. The resilient cover desirably moves between a first open position in which the cover is remote from the opening so that the interior region of the enclosure may be accessed through the opening and a second closed position in which the cover completely closes the opening. In certain preferred embodiments, the portable air compressor system includes a control panel which is aligned with the opening of the enclosure. During operation of the portable machine, access to the control panel may be obtained by opening the resilient cover.

The opening of the enclosure preferably includes a geometric shape selected from the group consisting of polygons, parallelograms and circles. The resilient cover generally has an outer periphery which substantially conforms to the shape of the opening. When viewed from the side, the resilient cover is shaped or molded to normally have a first radius which is greater than the radius of the curved region of the enclosure. However, the cover may be flexed and bent so that when the resilient cover is in the first open position the resilient cover defines an arch having a first radius greater than the radius of the curved region of the enclosure, and when the resilient cover is in the second closed position the resilient cover defines an arch having a second radius which is smaller than the first radius. In other words, when the resilient cover is in the second closed position, the shape of the resilient cover substantially conforms to (i.e., substantially equals) the radius of the curved region of the enclosure. As a result, when the resilient cover is in the second closed position, the outer surface of the enclosure and the resilient cover generally form a substantially continuous surface. The resilient cover preferably includes a polymer material capable of being compressed or flexed into the second closed position (at which point the resilient cover stores energy) and sprung back to the first open position.

The enclosure preferably includes a securing element for holding the resilient cover in the second closed position. The securing element is preferably movable between a locked position for holding the resilient cover in the second closed position and an unlocked position for allowing the resilient cover to spring open. Once the securing element has been moved to the unlocked position, the resilient cover is free to spring back to its normal shape, i.e., a curved structure having the first radius greater than the radius of the curved region of the enclosure. In certain embodiments, the securing element may include a latch or cam lock. The securing element may also include one or more VELCRO (hook and loop fastener) fasteners connected to the enclosure and the resilient cover.

The opening extending between the outer surface and the inner surface of the enclosure generally has peripheral edges located at the outer surface of the enclosure. The opening includes a ledge extending between the inner and outer surfaces of the enclosure. The ledge may be integrally molded to the enclosure and preferably includes a top surface for supporting the resilient cover when the resilient cover is in the second closed position. The resilient cover may include a first hinged end which is hingedly connected to one of the peripheral edges of the opening and a second free end remote therefrom. The second free end preferably includes at least a portion of the securing element for selectively holding the resilient cover in the second closed position. The curved region of the enclosure surrounding the opening may also include at least a portion of the securing element. In certain preferred embodiments, the enclosure and the resilient cover include substantially the same materials, such as a polymer.

Other objects, advantages and features of the present invention will be readily apparent to one skilled in the art from the following detailed description of preferred embodiments when taken in conjunction with the accompanying drawings showing certain preferred embodiments of the present invention.

DETAILED DESCRIPTION OF PREFERRED EMBODIMENTS

Figure 1:
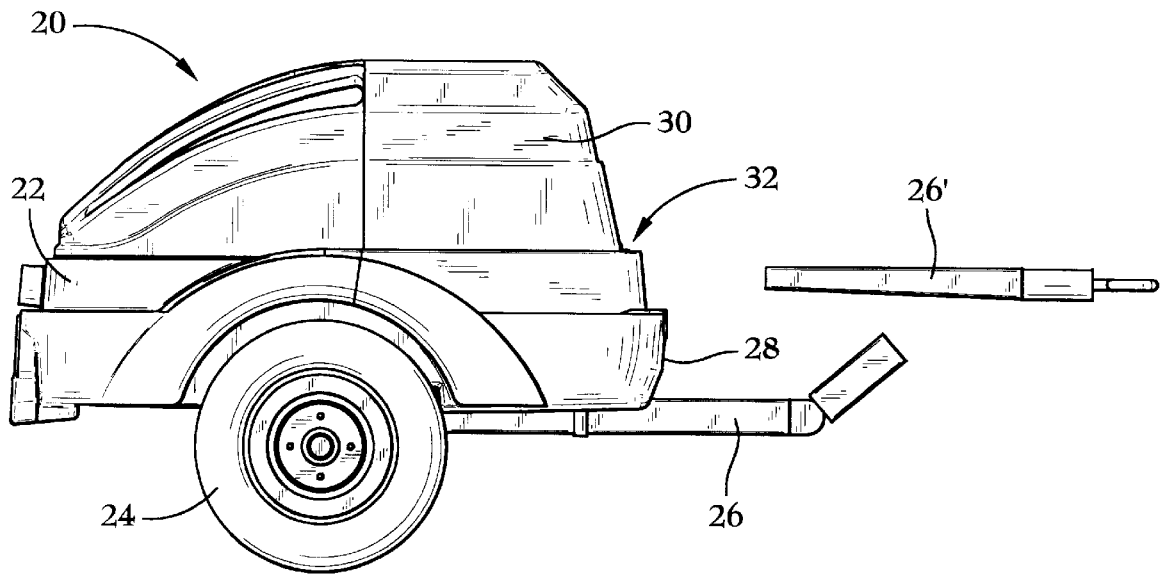
FIG. 1 shows a side view of an enclosure including an upper body and a lower body in accordance with certain preferred embodiments of the present invention.
Figure 2:
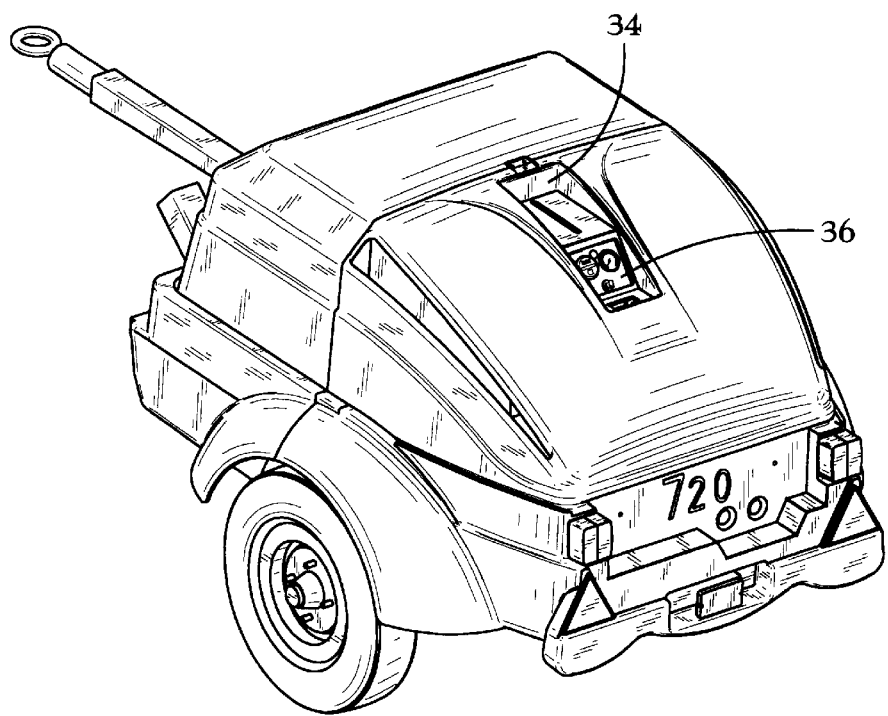
FIG. 2 shows a rear perspective view of the enclosure of FIG. 1 including an opening extending through the upper body for accessing an interior region of the enclosure.

FIGS. 1 and 2 show respective side and top perspective views of an improved enclosure 20 for a portable machine in accordance with certain preferred embodiments of the present invention. The enclosure 20 generally comprises a lower body 22 including a trailer having wheels 24 rotatably mounted thereto. The lower body 22 includes a tow bar 26 secured to the trailer; the tow bar projecting from a front end 28 of the lower body 22 for pulling the trailer. In other embodiments, the tow bar may include a flat version 26 having a fixed height above the ground or a raised version 26 which is capable of being adjusted so as to modify the angle of the tow bar relative to the ground. The lower body 22 preferably comprises a polymer, such as a high density polyethylene. In other preferred embodiments the lower body 22 may include other moldable materials, such as a medium density polyethylene or nylon. The enclosure 20 also includes an upper body 30 which preferably comprises a polymer material. The upper body 30 may include acrylonitrile butadiene styrene (ABS), a polymer material having a different coefficient of thermal expansion than the lower body 22. In one preferred embodiment, the upper body 30 is molded using a vacuum molding process. The utilization of polymer materials for the enclosure 20 generally enhances sound attenuation due to the natural ability of polymers to muffle sound. As is well known to those skilled in the art, polymers muffle sounds more efficiently than metals because they have a less dense molecular structure.

Figure 3:
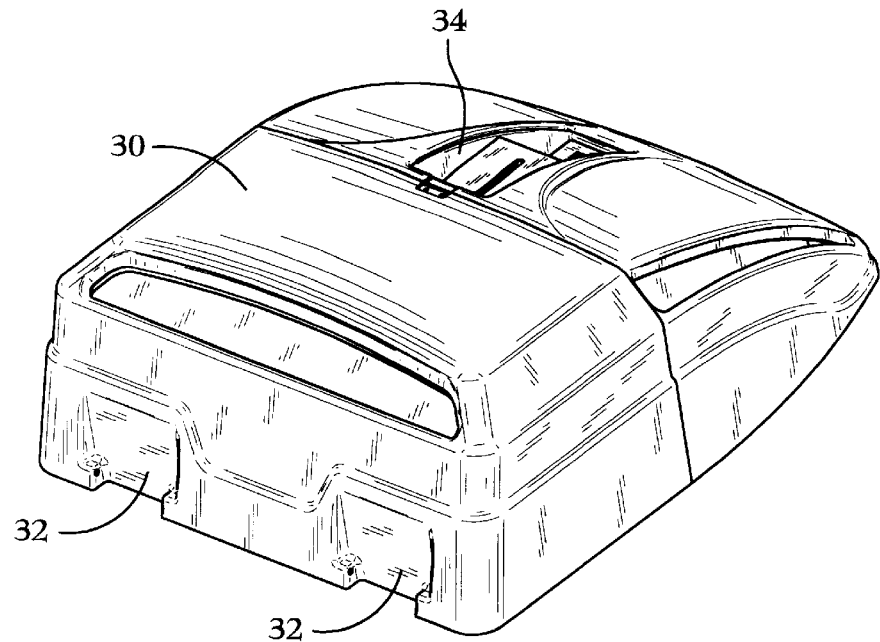
FIG. 3 shows a front perspective view of the upper body shown in FIGS. 1 and 2.

Referring to FIGS. 1–3, the enclosure 20 has a generally tear drop shape which generates favorable air flow patterns for minimizing wind resistance when the enclosure 20 is being towed. Thus, the tear drop shape saves energy and enhances the stability of the enclosure 20. Moreover, the use of polymer materials for the enclosure, as opposed to metal, reduces the overall weight of the trailer. In certain preferred embodiments, the polymer enclosure 20 has an overall weight of between approximately 375 to 425 kilograms, or about 20% lighter than prior art enclosures using metal. As a result, smaller vehicles may be used to tow the lighter weight enclosures disclosed herein. In addition, the reduced weight of the enclosure allows the enclosure to be towed at greater speeds and improved overall stability. Further, the use of polymer materials for the upper body 30 and lower body 22 provides for better sound attenuation during operation of the portable machine (not shown) carried within the enclosure 20.

Referring to FIGS. 1 and 3, the enclosure preferably includes one or more hinges 32 used to hingedly secure the upper body 30 to the lower body 22 so that the interior region of the enclosure may be easily accessed. For example, it may be necessary to perform repairs or maintenance upon the portable machine (e.g., air compressor system) carried within the enclosure 20. Thus, the upper body 30 may be rotated relative to the lower body 22 to provide such access. However during operation of the air compressor, it is highly desirable that the upper body 30 be closed atop the lower body 22 in order to muffle any sounds generated by the air compressor.

Referring to FIGS. 2 and 3, the upper body 30 of the enclosure 20 includes a relatively small opening 34 formed therein which provides access to an interior region of the enclosure 20. In the specific embodiment shown in FIG. 2, the opening is aligned with a control panel 36 for the portable air compressor. By providing an opening 34 through the enclosure 20, the air compressor may be controlled and monitored during operation thereof without opening the upper body 30 relative to the lower body 22, thereby avoiding the noise problems described above. As shown in FIG. 2, there are preferably no gaps between the edges of the opening and the face of the control panel 36 so as to minimize the amount of noise which may escape through such gaps.

Figure 4:
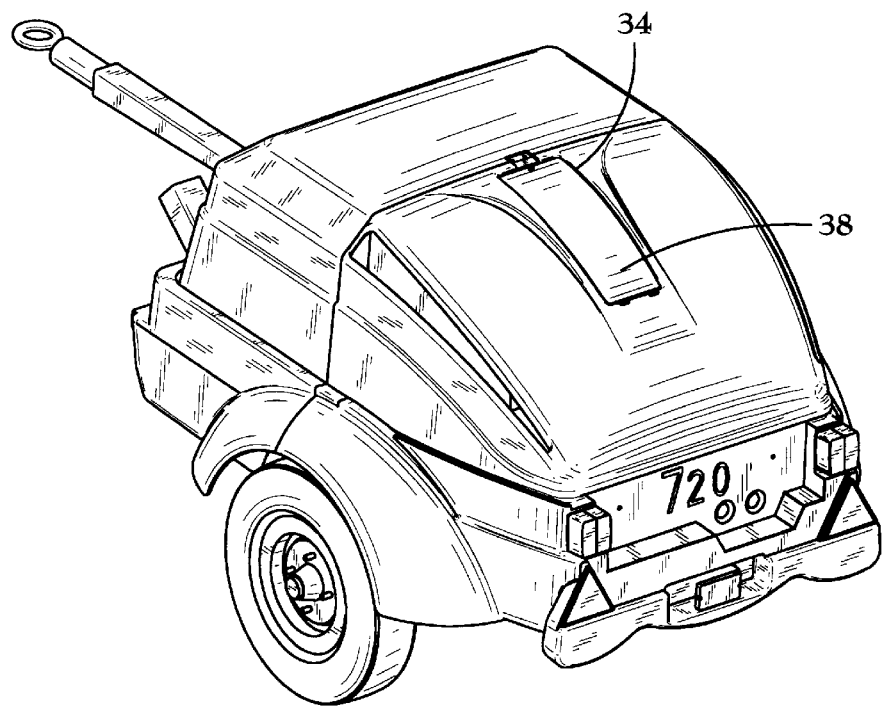
FIG. 4 shows the enclosure of FIG. 2 including a resilient cover which covers the opening of the enclosure.
Figure 5:
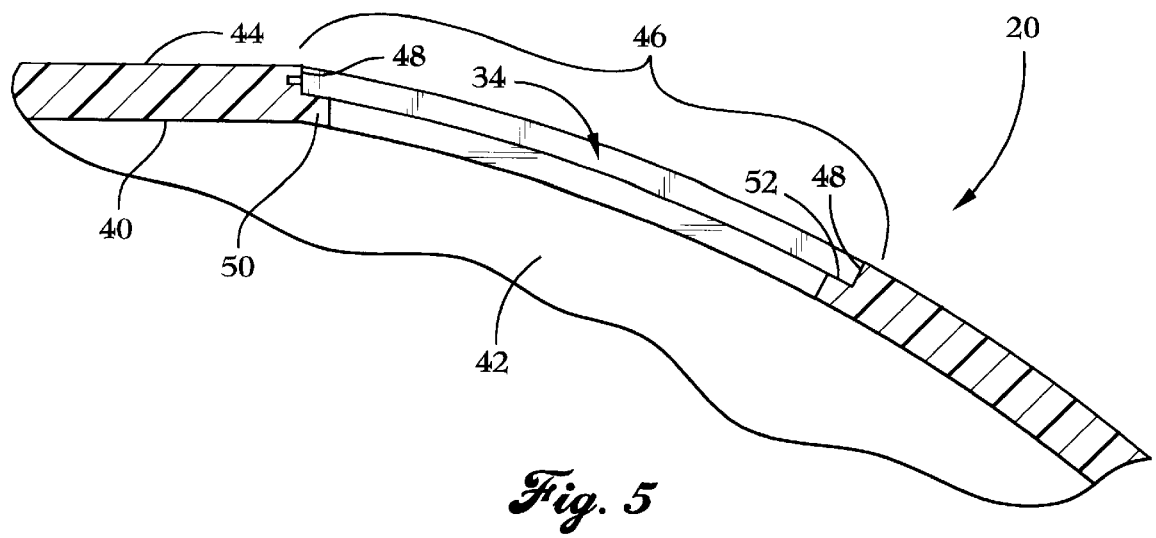
FIG. 5 shows a fragmentary cross-sectional view of the opening shown in FIGS. 2 and 3.

Referring to FIG. 4, the enclosure 20 preferably includes a resilient cover 38 which is hingedly secured to the upper body 30 for covering the opening 34 extending between an outer surface and inner surface of the enclosure 20. FIG. 5 shows a cross-sectional view of the opening 34 in accordance with one preferred embodiment of the present invention. As shown in FIG. 5, the enclosure includes an inner surface 40 facing an interior region 42 thereof and an outer surface 44 remote therefrom which includes a curved region 46 surrounding the opening 34; the curved region 46 having a radius. The opening 34 has peripheral edges 48 provided at the outer surface 44 of the enclosure 20 and includes a ledge 50 extending between the inner and outer surfaces 40, 44 of the enclosure 20. The ledge 50 is preferably integrally molded to the enclosure and is more preferably integrally molded to the inner and outer surfaces 40, 44 of the enclosure 20. The ledge 50 includes a top surface 52 which faces toward the outer surface 44 of the enclosure 20.

Figure 6A:
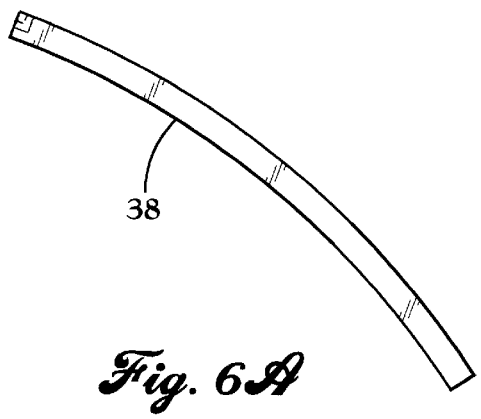
FIG. 6A shows a side view of a resilient cover in its normal shape in which the cover defines an arch having a first radius greater than the radius of the curved region of the enclosure, in accordance with certain preferred embodiments of the present invention.
Figure 6B:
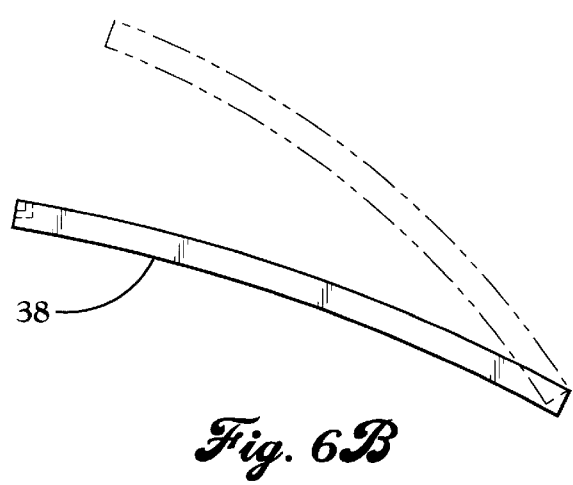
FIG. 6B shows the resilient cover of FIG. 6A after the resilient cover has been compressed or flexed to a shape which substantially conforms to the radius of the curved region of the enclosure.

FIG. 6A shows the resilient cover 38 in accordance with one preferred embodiment of the present invention. The resilient cover 38 preferably includes a polymer material which is substantially similar to that used to form the upper body of the enclosure. The polymer material is relatively flexible so that the resilient cover may be compressed to conform to the shape of the curved region of the enclosure when the cover is closed over the opening, yet spring back to its original shape when the cover is opened. FIG. 6B shows the resilient cover 38 of FIG. 6A after the cover has been compressed or flexed a predetermined amount so as to change the radius of the curved surface of the resilient cover. FIG. 6B uses dashed lines to show the original shape of the resilient cover (as shown in FIG. 6A) before the cover is compressed.

Figure 7:
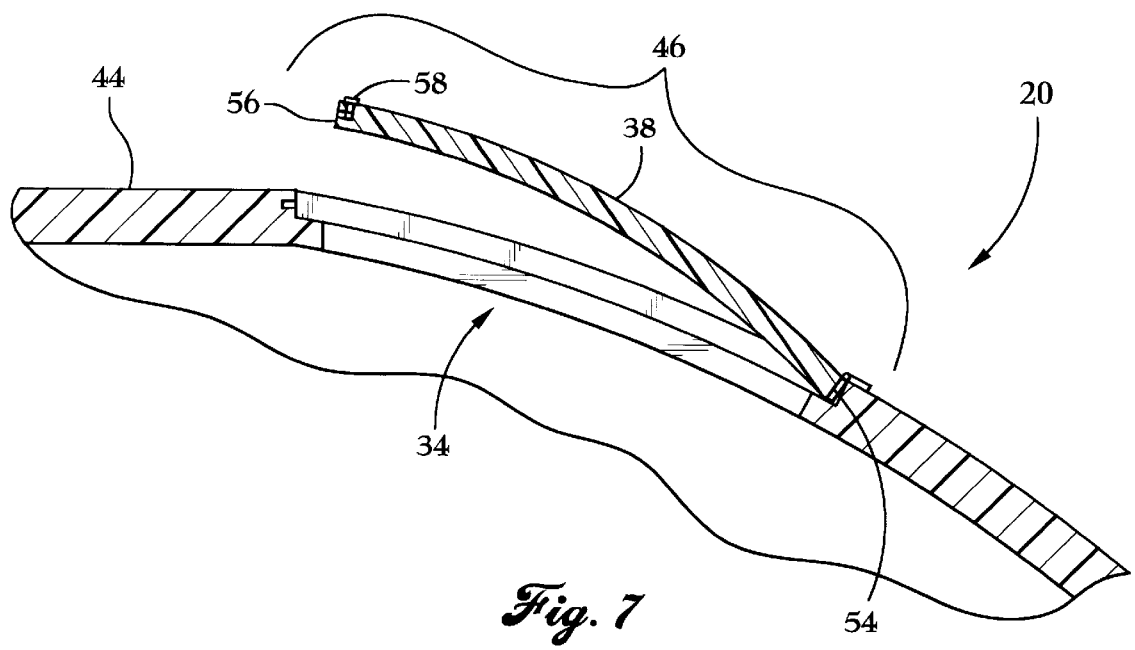
FIG. 7 shows a fragmentary side view of the enclosure of FIG. 4 including the resilient cover in the open position.
Figure 9:
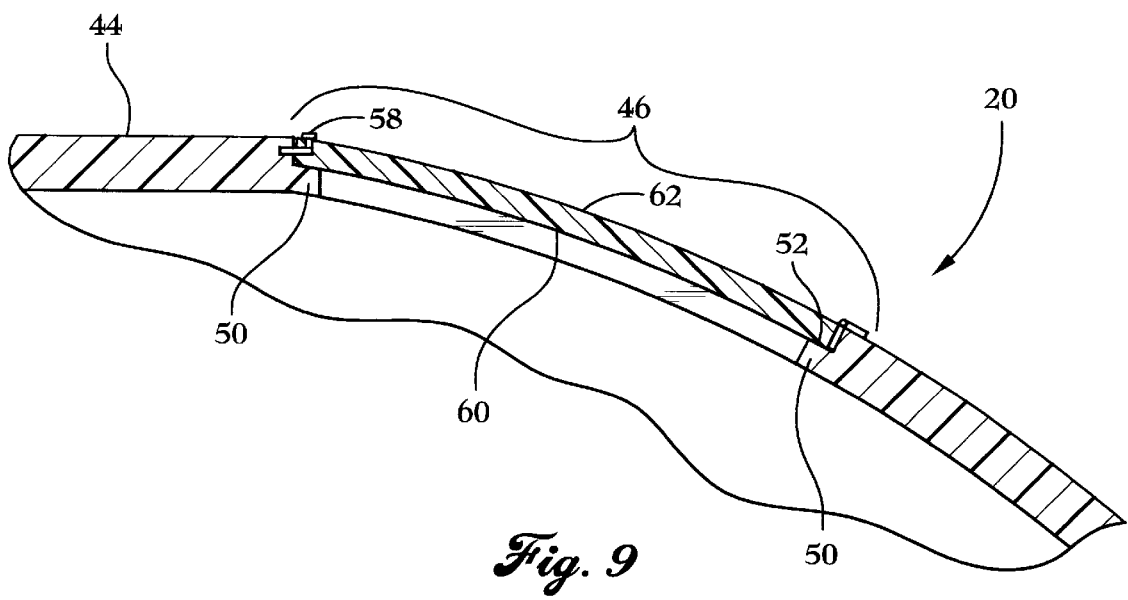
FIG. 9 shows the resilient cover of FIG. 7 in the closed position, with a securing element holding the cover in the closed position.
Figure 8:
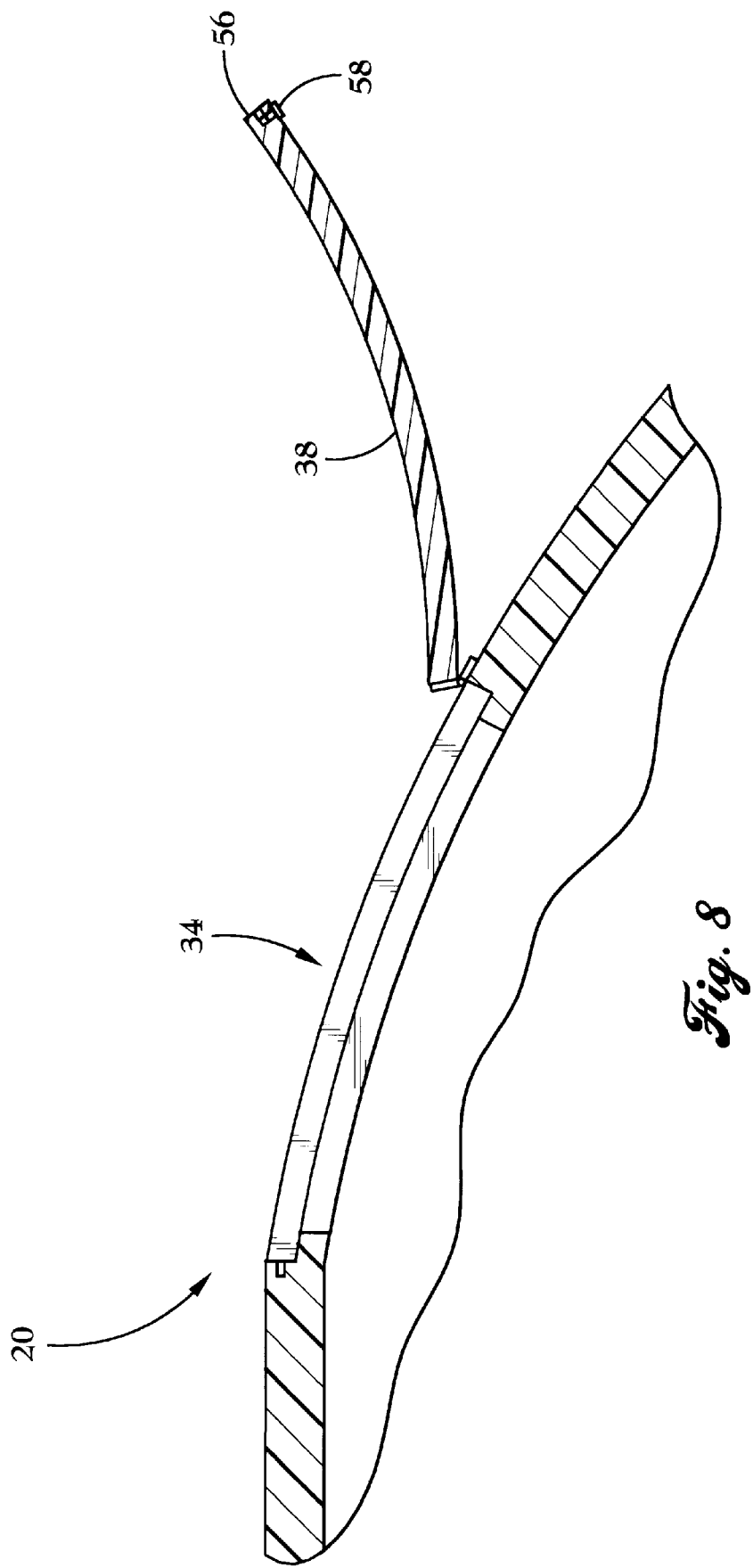
FIG. 8 shows the resilient cover of FIG. 7 in the fully open position.

FIG. 7 shows the resilient cover having a first end 54 hingedly secured to the enclosure 20 and a second free 56 end remote from the hinged end 54. The free end 56 includes a locking mechanism 58 for securing the resilient cover 38 to the enclosure 20 when the cover 38 has been moved to a closed position over the opening 34. As shown in FIG. 7, when in its final molded position, the resilient cover 38 has a natural shape including a curved surface having a radius which is larger than the radius of the curved region 46 of the enclosure 20. Thus, in its natural shape, the resilient cover 38 has a hinged end 54 connected to the enclosure 20 and a free end 56 overlying the outer surface 44 of the enclosure 20. In certain preferred embodiments, when in the open position of FIG. 7, the free end 56 is approximately 4–6 cm above the outer surface 44 of the enclosure 20. FIG. 8 shows the resilient cover 38 in the fully open position for providing access to the control panel (FIG. 2). FIG. 9 shows the resilient cover 38 in the closed position. When placing the resilient cover 38 in the closed position, the resilient cover 38 flexes so as to conform to the shape of the curved region 46 on the outer surface 44 of the enclosure 20. In the closed position, the cover 38 has an inner face 60 which engages the top surface 52 of the ledge 50. Thus, when secured in the closed position, the resilient cover 38 defines an arch having a radius which is equivalent to the radius of the curved region 46 of the enclosure 20 and which substantially conforms to the shape of the enclosure 20. As such, in the closed position the resilient cover 38 has an outer face 62 which generally forms a continuous, uninterrupted surface with the outer surface 44 of the enclosure 20.

As shown in FIG. 9, the enclosure includes a securing element 58 for holding the resilient cover 38 in the closed position. When in the closed position, the resilient cover 38 contains energy that is released upon unlocking the securing element 58 so that the resilient cover 38 will automatically spring back to the shape shown in FIG. 7. This springing feature is highly desirable as, inter alia, the instrument panel may be accessed by an operator wearing heavy gloves without providing the enclosure with an extra hole or handle for lifting the resilient cover. This greatly simplifies the design of the resilient cover 38 and minimizes the existence of any weak points through which an intruder may gain unauthorized entry into the enclosure.

As mentioned above, an air compressor generates a significant amount of noise during operation. This noise is significantly reduced by placing the air compressor within the enclosure disclosed herein. However, at certain times during operation of the air compressor, it may be necessary to monitor the performance of the machine. At such times, the resilient cover may be opened to access the control panel. Referring to FIGS. 7–9, this is accomplished by moving the securing element 58 to the unlocked position which allows the resilient cover 38 to spring away from the opening and revert back to its natural shape as shown in FIGS. 6A and 7. The free end 56 of the resilient cover 38 may then be easily grasped by an operator and rotated to the fully open position shown in FIG. 8. Once in the fully open position, the control panel is easily accessible for monitoring and/or controlling the air compressor. When the monitoring/controlling operation is complete, the resilient cover 38 is swung back toward the opening 34. As the resilient cover 38 is swung, the cover 38 is compressed and flexes so as to change shape from the first radius shown in FIG. 6A to the second, smaller radius shown in FIG. 6B.

Figure 10A:
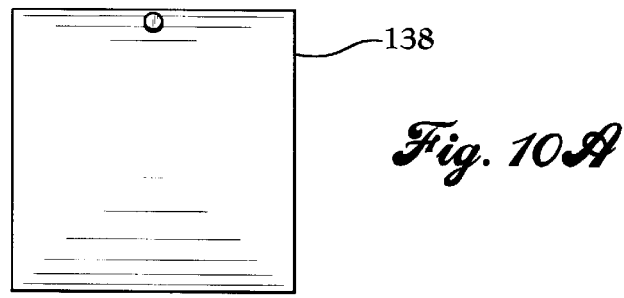
FIG. 10A shows a resilient cover having a substantially square shape in accordance with further preferred embodiments of the present invention.
Figure 10B:
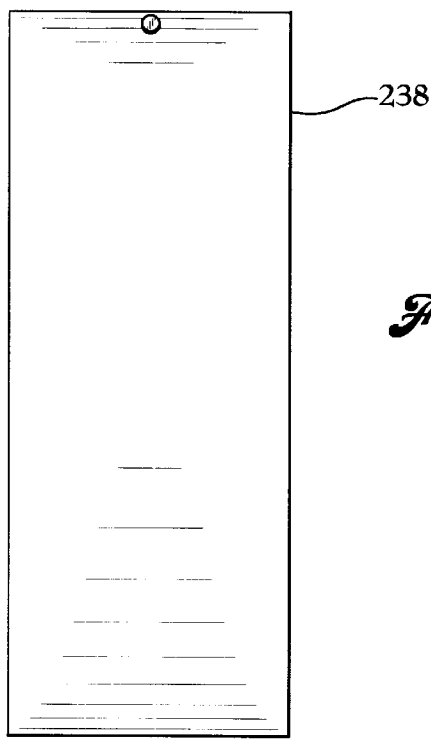
FIG. 10B shows a resilient cover having a substantially rectangular shape in accordance with yet further embodiments of the present invention.
Figure 10C:
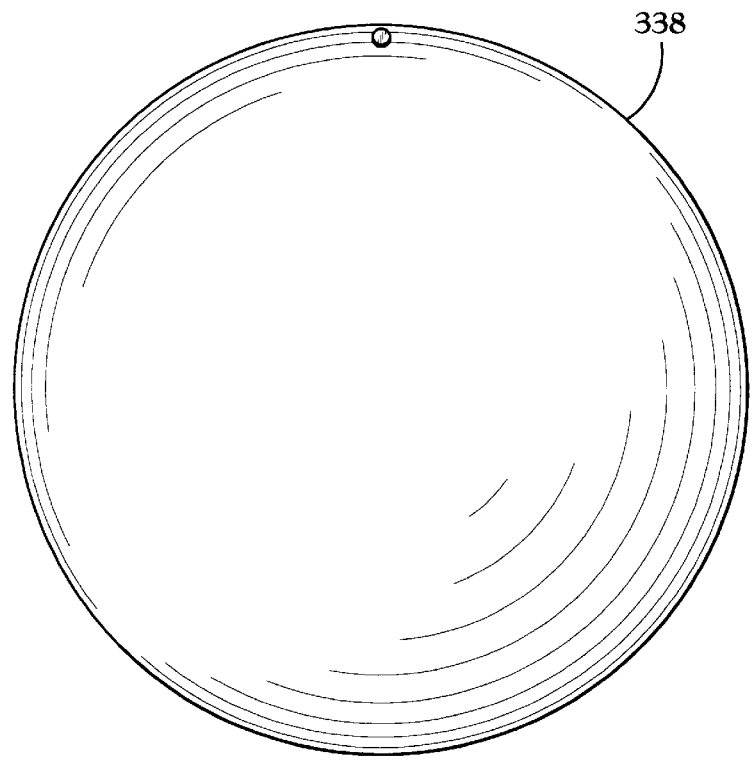
FIG. 10C shows a resilient cover having a substantially circular shape in accordance with still further embodiments of the present invention.

FIGS. 10A–10C show a top view resilient covers in accordance with further preferred embodiments of the present invention. FIG. 10A shows a resilient cover 138 having a substantially square shape. FIG. 10B shows the resilient cover 238 having a substantially rectangular shape. FIG. 10C shows the resilient cover 338 having a substantially circular shape. Although FIGS. 10A–10C show certain preferred geometric shapes for resilient covers, it is contemplated that the resilient cover may have any one of a number of shapes which are essentially dictated by the shape of the opening for the enclosure.

It will therefore be readily understood by those skilled in the art that the present invention may be used for a broad array of functions and applications and that many embodiments and adaptions of the present invention, other than those described herein, will be apparent from or reasonably suggested by the foregoing description without departing from the substance or scope of the present invention. For example, the enclosure may be used for other application such as covering stationery machines, entrances to structures or excavation sites. The enclosure may also be used for a wide variety of machines such as generators and pumps. Accordingly, while the present invention has been described in relation to its preferred embodiment, it is to be understood that this disclosure is only illustrative and exemplary of the present invention and is made merely for purposes of providing a full and enabling disclosure. The foregoing is not intended or to be construed to limit the present invention or otherwise to exclude any such other embodiments, adaptions, variations, modifications and equivalent arrangements, the present invention being limited only be the claims appended hereto and the equivalents thereof.

What is claimed is:

1. An enclosure having a resilient cover comprising:

said enclosure having an outer surface and an inner surface and an opening extending therebetween, the outer surface of said enclosure including a curved region having a radius; and said resilient cover being hingedly secured to said enclosure for selectively covering said opening and moving between a first open position and a second closed position, said resilient cover normally defining an arch having a first radius which is greater than the radius of the curved region of said enclosure when said resilient cover is in the first open position, wherein when said resilient cover is in the second closed position said resilient cover defines an arch having a second radius which is smaller than said first radius and which substantially conforms to the curved region of said enclosure.

2. The enclosure as claimed in claim 1, further comprising a securing element for holding said resilient cover in the second closed position.

3. The enclosure as claimed in claim 2, wherein said securing element is movable between a locked position for holding said resilient cover in the second closed position and an unlocked position for freeing said resilient cover to spring to the first open position.

4. The enclosure as claimed in claim 1, wherein said resilient cover includes a polymer material capable of being repeatedly compressed into the second closed position and sprung back to the first open position.

5. The enclosure as claimed in claim 1, wherein said resilient cover generally springs back to said first radius upon moving from said second closed position to said first open position.

6. The enclosure as claimed in claim 1, wherein said resilient cover stores energy as said resilient cover moves from the first open position to the second closed position.

7. The enclosure as claimed in claim 2, wherein said securing element includes a VELCRO fastener connected to said enclosure and said resilient cover.

8. The enclosure as claimed in claim 2, wherein said securing element includes a cam lock interconnecting said enclosure and said resilient cover.

9. The enclosure as claimed in claim 1, wherein the curved region of said enclosure surrounds said opening.

10. The enclosure as claimed in claim 1, wherein said opening has peripheral edges at the outer surface of said enclosure, said opening including a ledge extending between the inner and outer surfaces of said enclosure.

11. The enclosure as claimed in claim 10, wherein said ledge is integrally molded to said enclosure.

12. The enclosure as claimed in claim 10, wherein said ledge includes a top surface for supporting said resilient cover when said resilient cover is in the second closed position.

13. The enclosure as claimed in claim 10, wherein said resilient cover includes a first end hingedly connected to one of said peripheral edges of said opening and a second free end remote therefrom.

14. The enclosure as claimed in claim 1, wherein said enclosure and said resilient cover comprise substantially the same materials.

15. The enclosure as claimed in claim 1, wherein said enclosure and said resilient cover include a polymer.

16. The enclosure as claimed in claim 1, wherein the outer surface of said enclosure and said resilient cover form a substantially continuous, uninterrupted surface when said resilient cover is in the second closed position.

17. The enclosure as claimed in claim 1, wherein said enclosure comprises a lower body including a trailer.

18. The enclosure as claimed in claim 17, wherein said trailer supports a portable air compressor system.

19. The enclosure as claimed in claim 18, wherein said portable air compressor system includes a control panel in alignment with said opening of said enclosure.

20. The enclosure as claimed in claim 1, wherein said opening has a geometric shape selected from the group consisting of polygons, parallelograms and circles and said resilient cover has an outer periphery which substantially conforms to the shape of said opening.

* * * * *